United States Patent [19]
Brown

[11] 3,983,469
[45] Sept. 28, 1976

[54] CONTROLLED REACTANCE REGULATOR CIRCUIT

[75] Inventor: Harold J. Brown, Lorain, Ohio

[73] Assignee: Lorain Products Corporation, Lorain, Ohio

[22] Filed: Feb. 3, 1975

[21] Appl. No.: 546,554

[52] U.S. Cl. ............................ 321/9 R; 321/18; 321/47; 323/8
[51] Int. Cl.² ..................................... H02M 7/155
[58] Field of Search ............... 321/9 R, 18, 26, 47; 323/6, 8, 225 C, 24, 34, 38

[56] References Cited
UNITED STATES PATENTS

| | | | |
|---|---|---|---|
| 3,065,399 | 11/1962 | McNamee | 321/18 |
| 3,745,437 | 7/1973 | Brown | 323/8 X |
| 3,889,176 | 6/1975 | Randall | 323/8 |

Primary Examiner—A. D. Pellinen
Attorney, Agent, or Firm—Edward C. Jason

[57] ABSTRACT

A circuit for providing a regulated a-c or d-c output voltage from an unregulated a-c input voltage. A series inductance is connected between the regulator input and the regulator output to support the difference in voltage between the unregulated a-c input voltage and the regulated a-c or d-c output voltage. A controllable shunt reactance is connected to the source of input voltage, through the series inductance, to vary the current through and the voltage across the series inductance. Control circuitry controls the magnitude of the current which the shunt reactance draws through the line inductance, as required, to establish and maintain the regulated output voltage at the desired output current.

18 Claims, 11 Drawing Figures

CONTROLLED REACTANCE REGULATOR CIRCUIT

BACKGROUND OF THE INVENTION

The present invention relates to voltage regulating circuits and is directed more particularly to voltage regulating circuits wherein a controllable shunt reactance varies the voltage induced across an inductor, as required, to maintain that induced voltage equal to the difference in voltage between an unregulated input voltage and a regulated output voltage.

Voltage regulators utilizing series-connected inductors in association with shunt-connected capacitors have long been known and used for providing a substantially constant output voltage from an unregulated a-c input voltage. Early forms of such regulators were known as ferroresonant regulators and utilized series-connected inductors together with shunt-connected networks which included capacitors and saturable core magnetic units. Such concepts are shown, for example, in U.S. Pat. No. 2,143,745 granted to J. G. Sola on Jan. 10, 1939, and U.S. Pat. No. 2,377,152 granted in the name of H. M. Huge on May 29, 1945. Because of the excessive weight and audible noise associated with these saturable core magnetic units and because of the difficulty of obtaining an output voltage waveform of satisfactory harmonic content, many attempts have been made to improve upon ferroresonant type voltage regulators.

One attempt to improve upon ferroresonant voltage regulators has involved the substitution of a plurality of series-connected, saturable core magnetic units for each single saturable core magnetic unit thereof. such substitutions are shown, for example, in U.S. Pat. No. 3,092,768 granted in the name of A. Kusko on June 4, 1963 and U.S. Pat. No. 3,139,577 granted in the name of D. Krezek on June 30, 1964. In circuits of the latter type, the seies-connected magnetic units saturate in a predetermined sequence to generate a waveform which is approximately sinusoidal. While circuitry of this type can provide a waveform of satisfactory harmonic content, it increases the complexity and cost of the regulator without eliminating the problems of excessive weight and audible noise.

Another attempt to improve ferroresonant voltage regulators has involved the substitution of gate controlled switching devices and linear inductances for each saturable core magnetic unit. Such substitutions are shown, for example, in U.S. Pat. No. 3,076,924 granted in the name of E. W. Manteuffel on Feb. 5, 1963. In such circuits, the linear inductance simulated the saturated impedance of a saturable core magnetic unit and the gate controlled switching devices simulated off-on conducting characteristic thereof. While the utilization of such solid-state circuitry did reduce the weight and noise associated with ferroresonant voltage regulators, it did not solve the problem of reducing the high harmonic content of its output voltage. In addition, such solid-state circuitry did not lend itself to use in true three phase voltage regulators. As a result, polyphase forms of such solid-state regulator circuits were produced by the uneconomical expedient of coupling together a plurality of single-phase solid-state regulator circuits.

A still more recent attempt to solve the above-described problem is described in U.S. Pat. No. 3,745,437 granted in my name on July 10, 1973. The circuitry shown and described in that patent will hereinafter be referred to as the circuitry of my earlier patent. While the circuitry of my earlier patent solves the problem of providing a true polyphase regulator circuit having an output voltage of acceptable harmonic content, it does not satisfactorily deal with certain practical problems which prevent that circuitry from being economical. In the circuitry of my earlier patent, it is, for example, desirable to utilize relatively expensive circuit components having special operating characteristics. Thyristors which can turn on and off in very short times are typically necessary. High performance core materials and low inductance capacitors are also typically necessary. Thus, while the circuitry of my earlier patent is a useful and operative structure, it has certain practical deficiencies. An additional disadvantage of the circuitry described in my earlier patent is that it produces substantial amounts of audible noise. This audible noise, in turn, imposes further practical limitations on the usefulness of the circuitry since the magnetic units must ordinarily be potted and the circuit as a whole surrounded by sound absorbing materials.

In accordance with the present invention, there is provided polyphase regulating circuitry which exhibits all of the numerous advantages of the regulating scheme described in my earlier patent, which is realizable with magnetic units utilizing ordinary core materials and ordinary winding configurations, and which utilizes ordinary capacitors and ordinary semiconductor devices. In addition, the regulating circuit of the present invention eliminates the problem of excessive audible noise and produces an output waveform of harmonic content which is even lower than that produced by the circuit of my earlier patent. Thus, the circuit of the present invention is a significant improvement over the voltage regulator circuit of my earlier patent.

SUMMARY OF THE INVENTION

It is an object of the invention to provide an improved voltage regulator circuit of the type wherein the output voltage is determined by the effect of a controllable shunt reactance on an inductor connected between the regulator input and the regulator output.

An additional object of the invention is to provide an improved voltage regulator circuit of the above type in which the waveform of the voltage across the shunt reactance is determined by a programmed redistribution of charge among a plurality of capacitors.

Another object of the invention is to provide an improved voltage regulator circuit which need not utilize magnetic devices, capacitors or semiconductor devices having special operating characteristics.

Still another object of the invention is to provide a voltage regulator circuit of the above type wherein the voltage across the controllable shunt reactance has an improved waveform of lower harmonic content.

Another object of the invention is to provide a regulator circuit of the above type in which each redistribution of charge among the capacitors is accomplished as a result of the timed initiation of a resonant current pulse, each resonant current pulse having a frequency of from three to ten times the frequency of the unregulated a-c input voltage.

Yet another object of the invention is to provide an improved polyphase voltage regulator circuit including a set of primary windings connected to the ac input, a first set of secondary windings connected to the regulator output, and a second set of secondary windings connected to the controllable shunt reactance.

It is another object of the invention to provide a polyphase voltage regulator circuit of the above character wherein differences in the configurations of the windings are utilized to reduce the ripple content of the regulated d-c output voltage.

DESCRIPTION OF THE PREFERRED EMBODIMENT

Figure 1:
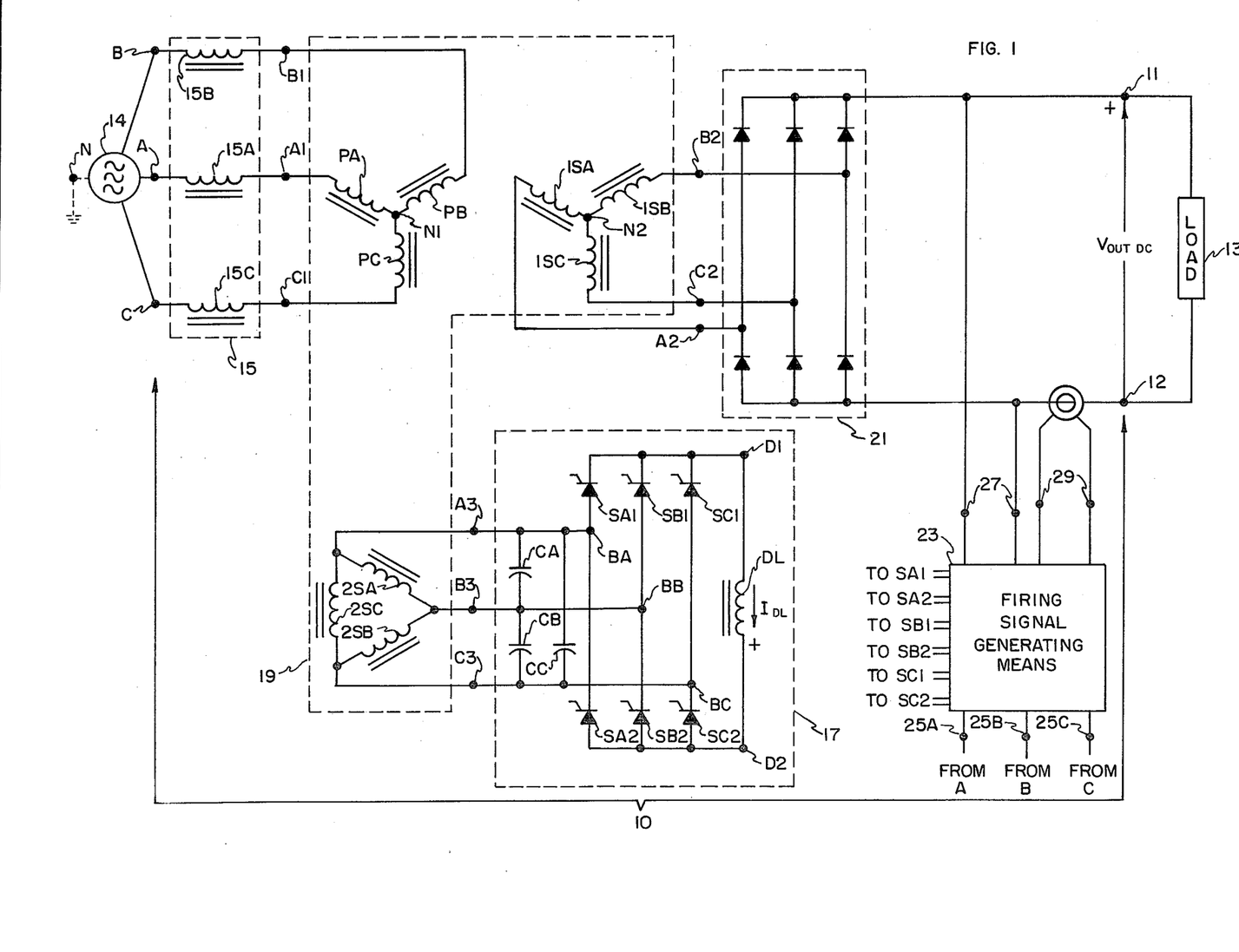
FIG. 1 is a schematic diagram of a preferred embodiment of the circuit of the invention.

Referring to FIG. 1, there is shown a voltage regulating circuit 10 for supplying a regulated d-c voltage to the terminals 11 and 12 of a d-c load 13 from the unregulated a-c voltage which a polyphase source 14 establishes at a-c input terminals A, B and C. Regulating circuit 10 includes a series regulating network which here takes the form of a line inductance 15 for supporting the difference between the unregulated a-c input voltages at terminals A, B and C and the regulated d-c output voltage at terminals 11 and 12. Line inductance 15 may comprise three separate substantially equal inductors connected between terminal pairs B-B1, A-A1 and C-C1 or, alternatively, may consist of three coupled windings 15B, 15A and 15C which are located on a single magnetic core.

Regulating circuit 10 also includes a controllable shunt reactance network 17 for inducing across line inductance 15 voltages equal to the difference between the available unregulated a-c input voltages and the regulated output voltage. As will be described more fully presently, reactance network 17 serves as a shunt regulating network which controls the voltage across inductance 15 by drawing therethrough, from source 14, a reactive current of controllable magnitude. Thus, series regulating network 15 and shunt regulating network 17 comprise cooperating portions of the power handling part of the circuit of the invention.

Regulating circuit 10 also includes a suitable three-phase rectifying network 21 which converts the a-c voltage at terminals B2, A2 and C2 to a d-c voltage at output terminals 11 and 12. It will be understood that if only an a-c output voltage is required, the desired output voltage and current may be drawn from terminals B2, A2 and C2. In the latter event, the current rating of the diodes of network 21 may be greatly reduced since they will conduct no load current. Alternatively, if both an a-c and d-c output voltages are required, d-c output 11–12 and a-c output B2, A2 and C2 may be used simultaneously.

Also forming an important part of regulating circuit 10 is a polyphase transformer 19 which, in the present illustrative embodiment, includes a set of three Y-connected primary windings PA, PB and PC, a first set of three Y-connected secondary windings 1SA, 1SB and 1SC, and a second set of three delta-connected secondary windings 2SA, 2SB and 2SC. Preferably, transformer 19 should be constructed so that the three windings identified with the letter A are located on one leg of the transformer core and so that the three windings identified with the letters B and C are located on respective second and third legs of the core.

Transformer 19 serves a variety of functions. Firstly, it allows the regulated output voltage to be higher or lower than the polyphase a-c input voltage, depending upon the turns ratios between primary windings PA, PB and PC and secondary windings 1SA, 1SB and 1SC. Secondly, transformer 19 allows the voltages at terminals A3, B3 and C3 of shunt regulating network 17 to be higher or lower than the a-c input voltages, depending upon the turns ratios between primary windings PA, PB and PC and secondary windings 2SA, 2SB and 2SC. Thirdly, transformer 19 serves a waveshaping function, i.e., causes the waveforms of the a-c voltages at terminals B2, A2 and C2 to be different from the waveforms of the voltages which network 17 applies to secondary windings 2SA, 2SB and 2SC. This waveshaping is utilized to reduce the ripple content of the d-c output voltage upon rectification by network 21.

The schematic diagram of the circuitry shown in FIG. 1 is similar to the schematic diagram of the circuitry shown and described in my earlier patent. For example, both the circuit of FIG. 1 and the circuit of my earlier patent include shunt reactance networks having a similar schematic representation. In addition, both the circuitry of FIG. 1 and the circuitry shown in my earlier patent include series-connected line inductances and three phase rectifying networks. The circuit elements which are utilized in constructing the regulator circuitry shown in FIG. 1 and that shown in my earlier patent are, however, quite different. More particularly, the circuitry of the present invention is preferably constructed with magnetic units including only ordinary core materials and ordinary winding configurations, with capacitors which need not have low distributed inductances and with semiconductor devices which have only ordinary turn-on and turn-off characteristics. The circuitry of my earlier patent, however, utilizes magnetic units, capacitors and semiconductor devices which have special characteristics and which are substantially more expensive than those utilized in the circuit of FIG. 1. In addition, the circuitry of the present invention is governed by different time relationships and operates within a range of frequencies which excludes operation in the manner described in my earlier patent. Thus, the circuitry of the present invention and that shown in my earlier patent are less similar than a visual comparison of their schematic diagrams would indicate.

In spite of the fact that the circuit of FIG. 1 costs substantially less than that of my earlier patent and utilizes time relationships which contravene the time relationships described therein, I have found that it has regulating properties which are equal to and in some cases better than the regulating properties of the circuitry described in my earlier patent. In addition, the circuitry of the present invention produces substantially less audible noise and mechanical vibration than the circuitry of my earlier patent. Finally, the circuitry of FIG. 1 produces waveforms of lower harmonic content and, consequently, has lower harmonic power dissipation. Thus, the circuitry shown and described herein is a significant improvement over the circuitry of my earlier patent.

As shown in FIG. 1, the terminals A3, B3 and C3 of shunt reactance 17 are coupled to the load side of inductor 15, i.e., to terminals A1, B1 and C1, through transformer 19. In addition, source 14 is coupled to terminals A1, B1 and C1 through inductor 15. Finally, terminals A1, B1 and C1 are coupled to terminals A2, B2 and C2, through transformer 19. As a result of these connections, the voltages at terminals A2, B2 and C2 are equal to the algebraic sums of the voltages at input terminals A, B and C and the voltages appearing across inductor windings 15A, 15B and 15C, respectively, multiplied by the turns ratios between primary windings PA, PB and PC and secondary windings 1SA, 1SB and 1SC. An additional result is that the voltages across inductor windings 15A, 15B and 15C are dependent upon the magnitudes of the reactive currents which capacitors CA, CB and CC draw from source 14, through inductance 15.

In the present embodiment, capacitors CA, CB and CC are preferably chosen to present to input terminals A, B and C capacitive reactances which are three times the inductive reactances presented to those terminals by the windings of inductance 15, causing the last-named reactive currents to lead the a-c input voltages by 90°. Since the flow of such reactive currents through inductor 15 induces across windings 15A, 15B and 15C voltages which add to respective phases of the a-c input voltage, the a-c voltages at terminals A1, B1 and C1 will be seen to be higher than the voltages at terminals A, B and C and to vary directly in accordance with the magnitudes of those reactive currents.

Based upon the above-described connections and magnitude relationships, a variety of explanations may be advanced to account for the regulating activity of the circuit of FIG. 1. On the one hand, network 17 may be visualized as an electronically adjustable three-phase capacitor, the magnitude of which is adjusted in accordance with the regulated output voltage. From this viewpoint, changes in the capacitance of the three-phase capacitor change the magnitudes of the reactive currents which this capacitor draws from source 14, through inductor 15, and voltage regulation may be visualized as the result of the variable capacitors drawing, through inductor 15, reactive currents which have magnitudes just sufficient to induce across that inductor the difference between the unregulated a-c input voltages at terminals A, B and C and the regulated voltages at terminals A1, B1 and C1 (or A2, B2 and C2 or 11 and 12).

On the other hand, network 17 may be visualized as a virtual three-phase voltage generator the voltages of which lag the a-c input voltages by a variable phase angle. From this viewpoint, the voltages between terminals A3, B3 and C3 may be visualized as the output voltages of the virtual generator and voltage regulation may be visualized as the result of the action of the actual source 14 and the phase-shifted virtual source 17 on inductor 15. In this view, virtual source 17 draws its operative energy from source 14 by way of the in-phase component of the current which network 17 draws from source 14, and the voltages which must be induced across inductor 15 to support the difference between the unregulated voltages at terminals A, B and C and the regulated voltages at terminals A1, B1 and C1 are induced by the flow of reactive circulating currents between sources 14 and 17. This view is particularly useful in understanding how variations in the power supplied to the load result from changes in the angle by which the voltages of virtual source 17 lag the voltages of actual source 14. A detailed description of this power control mechanism may be found in U.S. Pat. No. 3,576,443 granted in my name on Apr. 27, 1971.

In practice, it makes no difference which of these views is adopted. Accordingly, for purposes of this description, terminology stemming from either or both views will be used, depending upon which terminology most conveniently describes the subject matter then under discussion.

To the end that shunt reactance network 17 may draw from source 14, through inductor 15, reactive currents which cause the difference between the a-c input voltages and the regulated output voltage to appear across the windings of line inductor 15, or, alternatively, to the end that shunt reactance network 17 may vary the phase angle between the voltages which it applies to inductor 15, through transformer 19, and the input voltages at input terminals, B, A and C, network 17 includes a plurality of capacitors CA, CB and CC which are connected to one another in a delta-configuration. Network 17 also includes a plurality of thyristor switches SA1, SB1, SC1, SA2, SB2 and SC2 which are connected to one another as a polyphase bridge network having polyphase input terminals BA, BB and BC and having d-c output terminals D1 and D2 connected across a suitable discharge inductor DL.

In controlling the circuitry of FIG. 1 in accordance with the principles of the present invention, thyristors SA1 through SC2 are fired, two at a time, in a predetermined, recurring sequence by firing signals from a suitable firing signal generating network 23. As will be described more fully presently, varying the phase angle between these firing signals and the a-c input voltages at terminals A, B and C can vary the magnitudes of the reactive currents which capacitors CA, CB and CC draw from source 14, through inductor 15, and thereby vary the voltages at terminals A1, B1 and C1. For convenience, this angle will hereinafter be referred to as the power or control angle. In addition to varying the magnitude of reactive current flow, varying the control angle can also vary the power which source 14 can furnish to load 13, through inductor 15. In accordance with the present invention, the control angle is varied in accordance with the desired output voltage so that the output voltage has a constant value over a wide range of input voltages and output power levels.

In the present embodiment, the firing signals for thyristors SA1 through SC2 are generated by a suitable firing signal generating network 23. Preferably, network 23 has inputs 25a, 25b and 25c which are connected to input terminals A, B and C to allow the phase position of the input voltages to be determined and an input 27 which is connected to the regulator output to allow the sensing of output voltage variations. An input 29 may also be connected to the regulator output to sense the regulator output currents for current limiting purposes. While any feedback control network which fires thyristors SA1 through SC2 at the times necessary to maintain the output voltage at the desired value may be utilized, the preferred form of firing signal generating means 23, is as shown in my co-pending U.S. patent application, Ser. No. 514,849, filed Oct. 15, 1974, now U.S. Pat. No. 3,922,594 entitled "Control System For Phase Displacement Regulator Circuits", the disclosure of which application is hereby expressly incorporated herein by reference.

As previously described, it is desirable that the circuit of FIG. 1 produce d-c and/or a-c output voltages having a relatively low ripple content. In addition, it is desirable that the circuit of FIG. 1 not require the utilization of components having special operating characteristics such as short turn-on and turn-off times. In accordance with the present invention, these objectives are accomplished simultaneously.

One feature which allows this simultaneous result is the selection of values for capacitors CA, CB and CC and inductor DL such that the periodic firing of thyristors SA1 through SC2 results in the relatively slow periodic redistribution of charge among capacitors CA, CB and CC in a series of discrete resonant discharge and recharge or charge redistribution events. Each of these redistribution events is characterized by the flow of a pulse of current having a form which approximates that of the positive half of a sinusoid and having a frequency determined by any of capacitors CA, CB or CC and inductor DL. In order to facilitate reference to the preferred relationship which the a-c input frequency bears to the frequency fixed by any of capacitors CA, CB or CC and inductor DL, the latter frequency will hereinafter be referred to as the "resonant discharge frequency" or "discharge pulse frequency".

Another cooperating feature which allows the above two objectives to be achieved simultaneously is the proper selection of winding configurations for transformer 19. Particularly when a d-c output is utilized, the selection of transformer winding configurations can result in transformer 19 performing a waveshaping action which causes the voltages at terminals A2, B2 and C2 to have waveforms which produce negligible ripple upon rectification by network 21, as will be seen later in connection with FIGS. 6 and 7. This selection of transformer winding configurations can also be of some importance if only a-c output voltages are desired, but, in that event, the waveshaping action of transformer 19 is less important.

Figure 2:
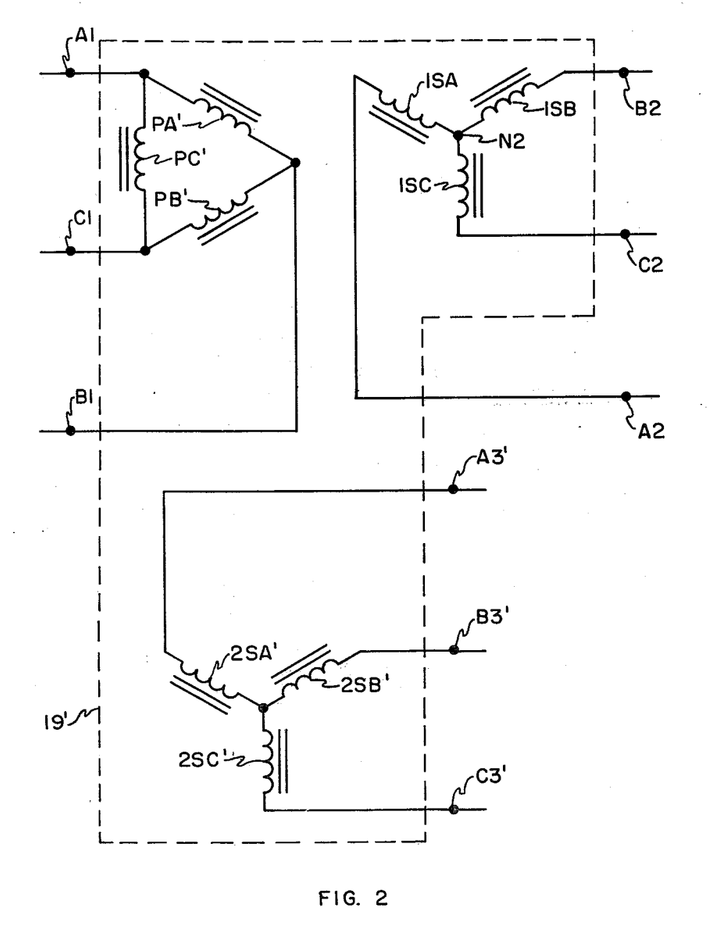
FIG. 2 is a schematic diagram of an alternative embodiment of a portion of the circuit of FIG. 1.

Within the above-described class of circuits, I have found that the most effective circuit configuration is one which utilizes the transformer configuration shown in FIG. 1, i.e., Y-connected primary and first secondary windings and delta-connected second secondary windings. It will be understood, however, that advantageous but less desirable transformer configurations may be utilized, for example, the transformer configuration shown in FIG. 2.

CIRCUIT WAVESHAPES

Figure 4:
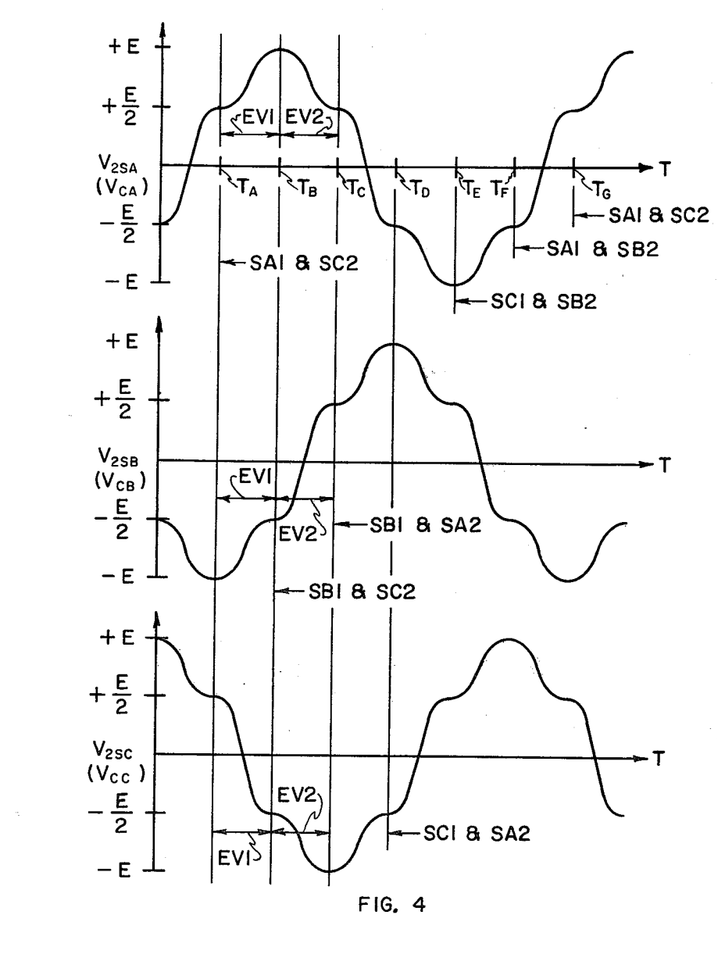

Referring to FIG. 4, there are shown the waveforms of the voltages across capacitors CA, CB and CC and, therefore, across secondary windings 2SA, 2SB and 2SC when the resonant discharge frequency is slightly greater than three times the frequency of the voltages at inputs B, A and C and when the latter voltages are relatively high. As will be described more fully later, the waveforms of the voltages shown in FIG. 4 are affected by the magnitude of the input voltage and the output power, but these effects are ordinarily not extreme for the input voltage and output power ranges normally encountered in regulator circuit design.

Referring to $V_{2SC}$, the voltage across secondary winding 2SC, it will be seen that between times $T_A$–$T_B$, voltage $V_{2SC}$ reverses from +E/2 to −E/2, that voltage $V_{2SB}$ across secondary winding 2SB decreases from −E to −E/2 and that voltage $V_{2SA}$ across secondary winding 2SA increases from +E/2 to +E. All three of these changes in voltage comprise a charge redistribution event EV1 and result from the turn-on of thyristors SA1 and SC2 at time $T_A$ and the turn-off of these same thyristors just prior to time $T_B$. The reversal of voltage $V_{2SC}$ results from the resonant discharging and recharging of capacitor CC through the path including thyristor SA1, inductor DL and thyristor SC2. The changes in voltages $V_{2SA}$ and $V_{2SB}$ occur as a voltage reaction to reversal in the voltage across capacitor CC, since the sum of the voltages across capacitors CA, CB and CC must be equal to zero.

Similarly, between times $T_B$ and $T_C$, the voltage $V_{2SB}$ across secondary winding 2SB reverses from −E/2 to +E/2. During the same period of time, $V_{2SA}$ and $V_{2SC}$, the voltages across secondary windings 2SA and 2SC change by E/2. All three of these changes in voltage comprise a redistribution event EV2 and result from the turn-on of thyristors SB1 and SC2 at time $T_B$ and the turn off of these same thyristors just prior to time $T_C$. The reversal of voltage $V_{2SB}$ results from the resonant discharging and recharging of capacitor CB through the path including thyristor SB1, inductor DL, and thyristor SC2. The changes in voltages $V_{2SA}$ and $V_{2SC}$ occur as a voltage reaction to the reversal in the voltage across capacitor CB, since the sum of the voltages across capacitors CA, CB and CC must be equal to zero.

It will be understood that during time intervals $T_C$–$T_D$, $T_D$–$T_E$, $T_E$–$T_F$ and $T_F$–$T_G$, additional charge redistribution events EV3, EV4, EV5 and EV6 occur and that following charge redistribution event EV6, the voltages shown in FIG. 4 will once again be at the values which they had at time $T_A$. The sequence of thyristor firings which give rise to the voltage waveforms shown in FIG. 4 are shown in FIG. 4 together with arrows indicating the times at which those thyristors are fired. Thus, six charge redistribution events are initiated by the firing of six pairs of thyristors to establish one complete cycle of the voltages shown in FIG. 4.

Figure 5A:
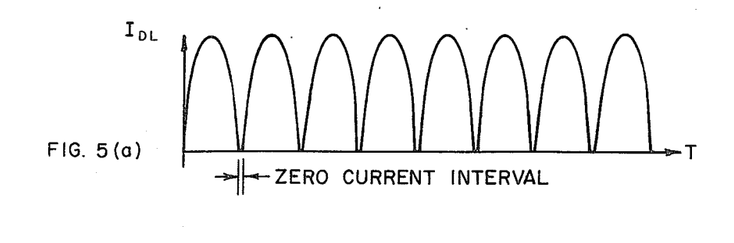

In the preferred embodiment of the invention shown in FIGS. 1 and 4, the discharge pulse frequency is slightly greater than three times the frequency of the a-c input voltage. As a result, under the conditions which exist when the waveforms shown in FIG. 4 are produced, each charge redistribution event such as EV1 begins and ends in slightly less than 60° of the input voltage. During the time between the end of one redistribution event and the beginning of the next redistribution event, e.g., between the time when thyristors SA1 and SC2 turn off at the end of EV1 and the time that thyristors SB1 and SC2 turn on at the beginning of EV2, the current in inductor DL is equal to zero since thyristors SA1 through SC2 are all non-conducting. These zero current intervals are illustrated in FIG. 5(a) wherein $I_{DL}$, the current through inductor DL, is plotted as a function of time.

Figure 5B:
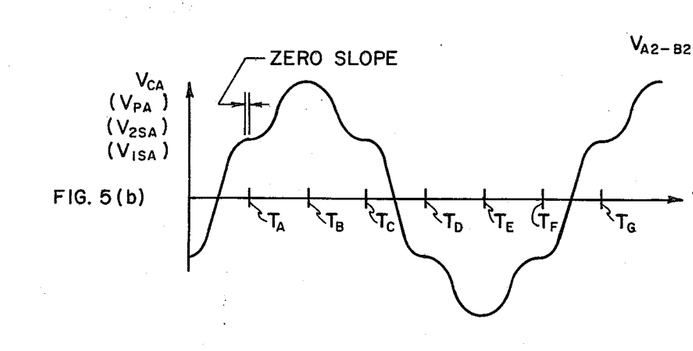
Figure 5C:
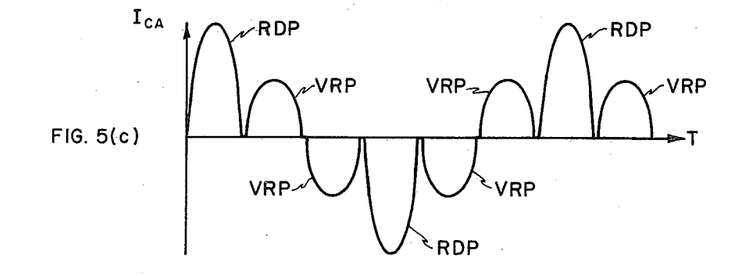

Referring to FIGS. 5(b) and 5(c), there are shown $V_{CA}$, the voltage across capacitor CA, and $I_{CA}$, the current through capacitor CA, and their relationship to the current through inductor DL. In comparing waveforms $V_{CA}$ and $I_{CA}$, it is apparent that each change in the voltage across capacitor CA is accompanied by a pulse of current therethrough. The larger ones of these pulses are labeled RDP to indicate that those pulses flow when capacitor CA resonantly discharges through inductor DL. The smaller ones of these pulses are labeled VRP to indicate that those pulses flow as a result of a voltage reaction in capacitor CA to the resonant discharge of one of the other capacitors through inductor DL. The current pulses through inductor DL, however, are all equal and all flow as a result of the resonant discharge of one or another of capacitors CA, CB or CC. Thus, when the resonant discharge frequency is slightly greater than three times the frequency of the a-c input voltage, the current through inductor DL and the current through each capacitor comprises a series of discrete pulses of current, one set of capacitor current pulses being present for each charge redistribution event.

In practicing the invention, the resonant discharge frequency may be as high as ten times the frequency of the a-c input voltage, without incurring certain of the disadvantages of the circuit of my earlier patent. These higher discharge frequencies, however, reduce the number of degrees of the input voltage which are occupied by each resonant discharge pulse. As a result, both the zero current intervals in inductor current $I_{DL}$ and the zero sloped portions of the capacitor voltage waveforms will become wider. These changes in waveform increase the harmonic content of the waveforms across the windings of transformer 19 without any compensating improvement in the operative characteristics of the circuit of FIG. 1 and are, consequently, less desirable than the utilization of resonant discharge frequencies which are within the preferred frequency range of from three to six times the a-c input voltage frequency.

On the other hand, the resonant discharge frequency may be lower than three times the frequency of the a-c input voltage. As these lower pulse frequencies are selected, however, each resonant discharge pulse will occupy more than 60° of the input voltage. As a result, the current through discharge inductor DL will become continuous, i.e., will not fall to zero, and the zero-sloped portions of the capacitor voltages will disappear entirely. While operation within this range of discharge frequencies does not prevent the utilization of the circuit of FIG. 1 as a voltage regulator, it causes the circuitry to exhibit a dynamic response which is significantly slower than that provided when the discharge frequency is within the preferred frequency range of from three to six times the frequency of the a-c input voltage.

In view of the foregoing, it will be seen that while the circuit of FIG. 1 may be operated with resonant discharge frequencies which are less than three times or more than ten times the a-c input voltage frequency, the circuitry of the invention contemplates operation at resonant discharge frequencies within those limits and, in the preferred form of the invention, contemplates operation at resonant discharge frequencies which are three to six times the a-c input voltage frequency.

As previously described, it is desirable that the rectification of the regulated a-c voltage at terminals B2, A2 and C2 provide a d-c output voltage which has a relatively low ripple content. This low ripple content is desirable not only because it allows the regulator circuitry of the invention to be constructed without incurring the expense of heavy output filtering, but also because the absence of heavy output filtering allows the voltage regulating circuitry to have a dynamic response which is quite rapid, e.g., on the order of 20 milliseconds. In accordance with the present invention, the need for heavy output voltage filtering is eliminated as a result of the combined effect of the above-described frequency relationship and the connection of first secondary windings 1SA, 1SB and 1SC in a Y-configuration.

Figure 6A:
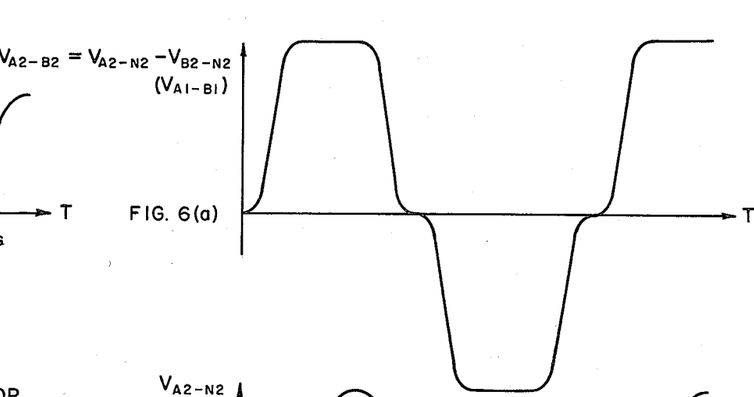
Figure 6B:
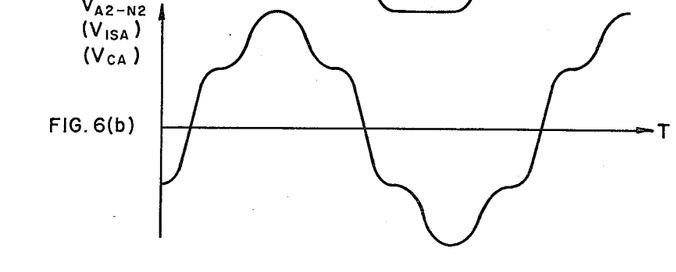
Figure 6C:
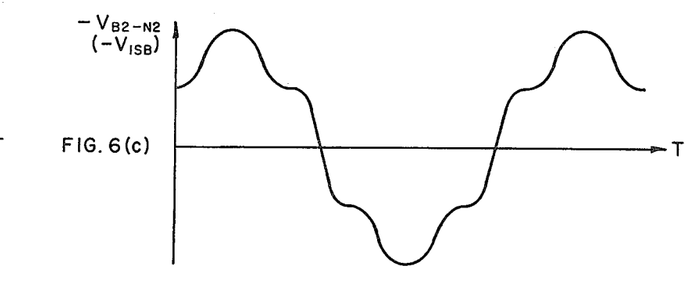
Figure 7:
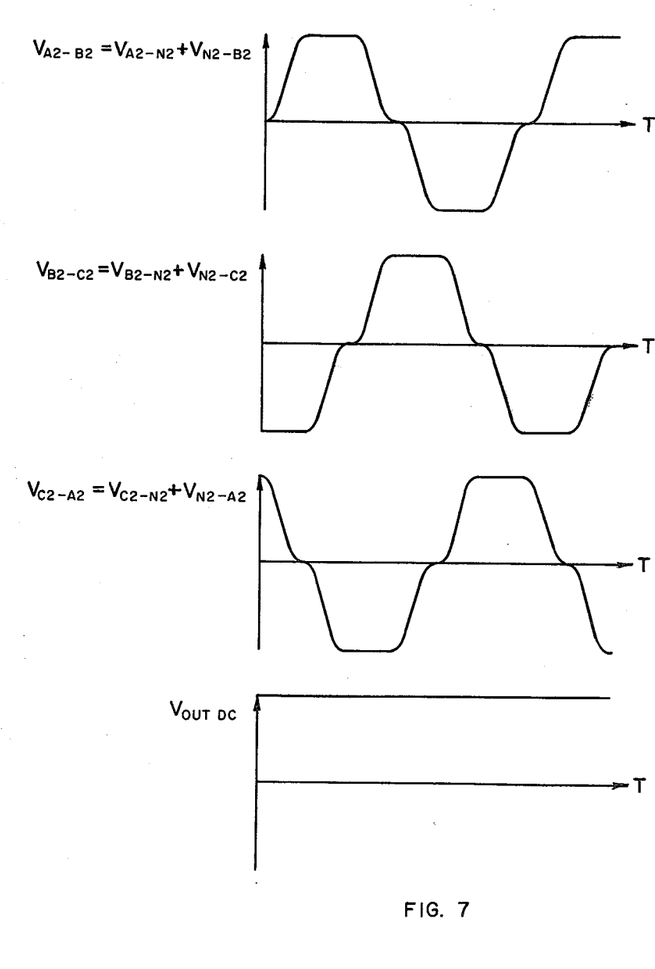

Referring to FIG. 6a, there is shown voltage $V_{A2-B2}$, the voltage from a-c output terminal A2 to a-c output terminal B2. Because of the Y-configuration of windings 1SA, 1SB and 1SC, this voltage is equal to the sum of the voltage from terminal A2 to terminal N2 and the voltage from terminal N2 to terminal B2. Stated differently, voltage $V_{A2-B2}$ is equal to the voltage from terminal A2 to terminal N2 minus the voltage from terminal B2 to terminal N2. The fact that the two last-named voltages combine to establish the flat-topped waveform shown in FIG. 6a may be verified by adding the voltages shown in FIGS. 6b and 6c. It will be understood that the waveforms of voltages $V_{B2-C2}$ and $V_{C2-A2}$ are of similar waveshape, but lag voltage $V_{A2-B2}$ by 120° and 240°, respectively, as shown in FIG. 7. Thus, the coupling of delta-connected secondary windings 2SA, 2SB and Y-connected secondary windings 1SA, 1SB and 1SC causes the waveforms of voltages at a-c terminals A2, B2 and C2 to be different from the waveforms of the voltages at a-c terminals A3, B3 and C3.

Referring to FIG. 7, it will be seen that, ideally speaking, at least one of the three flat-topped voltages at terminals B2, A2 and C2 is at its peak value at all times. Because of this fact, and because rectifying network 21 is a full-wave rectifier network, the regulated a-c voltages at terminals A2, B2 and C2 produce a regulated d-c voltage upon rectification by network 21. Thus, the d-c output voltage at terminals 11 and 12 has a value substantially equal to the peak value of the regulated a-c voltages at terminals B2, A2 and C2 and is substantially free of ripple.

In practice, the d-c voltage appearing at the output of rectifying network 21 may require filtering before it is applied to a load having stringent ripple limitations. One reason why this filtering may be necessary is that source 14, acting through line inductor 15, can cause a component of current having a frequency equal to the a-c input frequency to flow through capacitors CA, CB and CC during each charge redistribution event. This component of current, in turn, causes the waveforms of the voltages across transformer 19 to be distorted somewhat from the shapes shown in FIG. 4. With proper selection of values for components 15 and capacitors CA, CB and CC, however, the effect of this distortion can be eliminated with only light output voltage filtering.

OUTPUT VOLTAGE REGULATION

The start-up and voltage regulating activity of the circuit of FIG. 1 will now be described. As voltage is initially applied to a-c input terminals A, B and C, a-c transient voltages and currents begin to appear across and through the windings of inductor 15 and, through transformer 19, across and through capacitors CA, CB and CC. Assuming that thyristors SA1 through SC2 are initially non-conducting, the voltages at terminals A1, B1 and C1 will rise toward the steady-state a-c values which they would attain if the last-named thyristors remained nonconducting. Ordinarily, these steady-state voltages will be higher than those necessary to furnish the desired output voltage. This rise to those higher voltages is stopped at the proper output voltage value by the switching activity of thyristors SA1 through SC2, which thyristors cooperate with inductor DL to effectively cancel that portion of the capacitance of capacitors CA, CB and CC which would allow the output voltage to rise to too high a value.

More particularly, as the output voltage rises, thyristors SA1 through SC2 and inductor DL begin to increase the capacitive reactance which capacitors CA, CB and CC present to source 14 and thereby begin to oppose increases in the magnitudes of the reactive currents that network 17 draws from source 14, through inductor 15. As a result, the induced voltages across inductor 15 and the voltages at terminals A1, B1 and C1 begin to approach their final, desired values more slowly. it will be understood that as the voltages at terminals A1, B1 and C1 attain the desired values, a condition is attained in which the switching activity of thyristors SA1 through SC2 is just sufficient to induce across inductor 15 the difference between the unregulated input voltages and the desired output voltage. After the latter condition is attained, it is maintained, over a wide range of input voltages and output power levels, by the voltage regulating activity of the circuit of the invention, as will now be explained.

Assume, as an example, that the input voltage is at its nominal value and that source 14 is supplying no load power through inductance 15. Under these conditions, firing signals are applied to network 17 at about the same times that the a-c input voltages cross through zero. As a result, the capacitor voltages will cross through zero approximately 30° later, i.e., later by one-half of a 60° resonant discharge event, as shown in FIGS. 5a and 5b. Because, as shown for a representative pair of voltages in FIGS. 6a and 6b, the voltages at terminals A1, B1 and C1, lead the capacitor voltages by 30°, the zero-crossings of the voltages at terminals A1, B1 and C1 will occur at approximately the same times as the zero-crossings of the voltages at terminals A, B and C. Consequently, the power angle will be approximately equal to zero and no load power will be delivered. In practice, some small power angle will appear to allow source 14 to furnish the operating losses of the circuit of FIG. 1.

At the same time, since the input voltages are at their nominal values and are approximately in phase with the voltages at terminals A1, B1 and C1, the difference between the latter voltages will appear across the windings of inductance 15 and have values which are between low voltages which appear thereacross under high input voltage conditions and the higher voltages which appear thereacross under low input voltage conditions. This condition exists because the switching activity of thyristors SA1 through SC1 is such that the magnitudes of the reactive currents drawn by network 17 are between the low magnitude currents which flow therethrough under high input voltage conditions and the high magnitude currents which flow therethrough under low input voltage conditions. At the same time, the average value of the current in inductor DL will be between the high values of average current which flow therethrough under high input voltage conditions and the low values of average current which flow therethrough under low input voltage conditions.

If, under the above conditions, the input voltages should decrease, the voltages at terminals A1, B1 and C1 will also decrease. The latter decrease in voltage will, in turn, cause control network 23 to retard the phase position of the firing signals in relation to the input voltages and thereby cause the power angle to increase. As a result, source 14 will begin to supply real power through inductance 15. Since capacitors CA, CB and CC are the only circuit elements capable of receiving this energy, they will do so and thereby force the voltages at terminals A1, B1 and C1 to return to their original higher values. The ability of network 23 to advance the phase position of the firing signals, and thereby remove this energy from the capacitors, serves to prevent the voltages at terminals A1, B1 and C1 from rising beyond their original values. Thus, as the input voltages decrease from their nominal values, the phase position of the firing signals is changed by an amount just sufficient to keep the output voltage at the desired value.

During the above-described change in phase position, there also occur increases in the reactive currents which network 17 draws from source 14, through inductance 15. These increased reactive currents in turn increase the induced voltages across inductance 15 to reflect the increased difference between the new, lower input voltage and the regulated output voltage. At the same time, the average current through inductor DL decreases, in accordance with the increase in reactive current flow, to reflect an increase in the effective capacitance which capacitors CA, CB and CC present to source 14. Thus, as the input voltages decrease from their nominal values, the reactive currents through inductance 15 rise and the average current through inductor DL falls.

It will be understood that if the input voltages should rise to above their nominal values, the phase position of the firing signals will be advanced in phase in relation to the input voltages by an amount just sufficient to establish the regulated output voltage at the new higher values of input voltage. Under these conditions, however, the reactive currents drawn by network 17 will have relatively low values and the average current through inductor DL will have a relatively high value.

The operation of the regulator circuit of the invention in the presence of load current flow is similar to that just described in connection with input voltage changes. In the presence of load current flow, however, the change in power angle is greater, since it includes a component which reflects the load power being supplied as well as a component which results from the previously described angular adjustment for input voltage changes. Accordingly, the operation of the circuit of FIG. 1 in the presence of changes in load current will not be described in detail herein.

In operating with the circuit of FIG. 1, control network 23 generates pairs of firing signals which, under steady-state conditions, are separated from the preceding and following pair of firing signals by 60° of the a-c input voltage. The phase angle between the firing signals as a whole and the a-c input voltages, however, is dependent upon the magnitude of the input voltage and the output current. As the magnitude of the input voltages or the output current change from the above values, the firing signals will assume new phase relationships to the input voltage and thereby restore the output voltage to the desired, regulated value. During this period of phase adjustment, successive sets of firing signals may be separated by more or less than 60° of the input voltage, but this will be true only until the new steady-state phase position is attained. Thereafter, successive sets of firing signals will once again be separated by 60° of the input voltage, but the set of firing signals as a whole will be located in a different phase position with respect to the input voltages. These control characteristics together with other desirable characteristics such as limits on the rate of change of phase angle are advantageously provided by the control circuitry described in my previously mentioned copending application.

Figure 3:
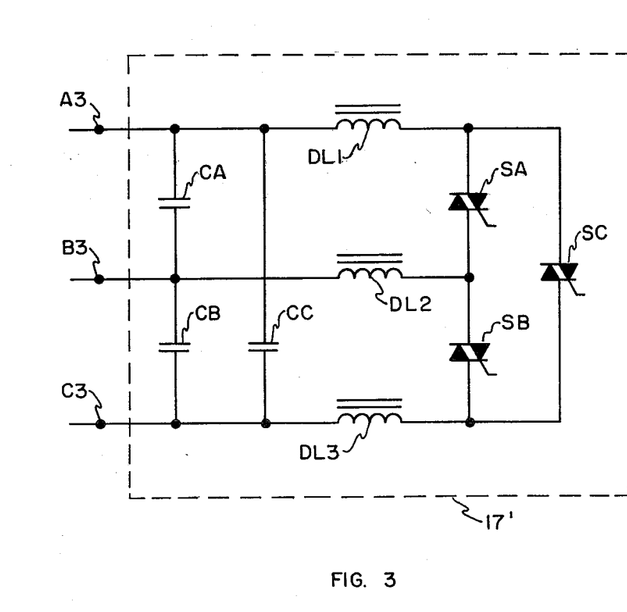
FIG. 3 is a schematic diagram of an alternative embodiment of another portion of the circuit of FIG. 1, and FIGS. 4 through 7 illustrate various exemplary voltage and current waveforms produced by the circuit of FIG. 1.

While the circuitry of FIG. 1 illustrates the preferred form of controllable shunt reactance 17, any suitable capacitive-inductive-switching network having similar operative characteristics may be utilized in place thereof. FIG. 3 illustrates one such alternative controllable shunt reactance network 17'. In the latter network, the function of inductor DL of FIG. 1 may be served by the substantially equal separate inductors DL1, DL2 and DL3 or may be served by a single, polyphase inductor having three coupled windings arranged in the manner shown in FIG. 3. In addition, the function of thyristors SA1 through SC2 is served by triacs SA through SC. It will be understood that the firing pattern for triacs SA through SC is similar to but simpler than that utilized for thyristors SA1 through SC2 and may be easily derived therefrom.

In view of the foregoing, it will be seen that the circuit of the invention comprises an improved voltage regulator circuit which utilizes novel time and transformer winding relationships to afford improved electrical performance and efficiency while at the same time substantially reducing circuit costs.

It will be understood that the foregoing embodiments of the invention have been shown for illustrative and descriptive purposes only and that the full scope of the present invention is as set forth in the appended claims.

What is claimed is:

1. A voltage regulator circuit comprising in combination, an a-c input for connection to a source of a-c voltage an output for connection to a load, first inductance means for supporting a voltage dependent upon the difference between the a-c voltage at the input and the voltage at the output, a transformer having a set of primary windings, a first set of secondary windings and a second set of secondary windings, means for connecting the first inductance means between the a-c input and the primary windings, means for connecting the first set of secondary windings to the output, at least three capacitors connected in a closed circuit path, the sum of the capacitor voltages around said closed circuit path being equal to zero, means for connecting the second set of secondary windings to the capacitors, second inductance means for conducting the flow of a resonant discharge current through each capacitor, the resonant discharge frequency of the resonant discharge current being determined by the second inductance means and the capacitors and being greater than three but no more then ten times greater than the frequency of the voltage at the input, controllable switching means for initiating and terminating the flow of a resonant discharge current through each capacitor and thereby forcing a redistribution of charge among the then remaining capacitors, control means for generating firing signals for the controllable switching means and for varying the phase position of said firing signals in accordance with the voltage at the output to maintain the voltage at the output at a substantially constant value.

2. A voltage regulator circuit as set forth in claim 1 wherein the means for connecting the first set of secondary windings to the output includes rectifying means for establishing at the output a d-c voltage the magnitude of which varies in accordance with the magnitude of the a-c voltage on the first set of secondary windings.

3. A voltage regulator circuit as set forth in claim 1 wherein the resonant discharge frequency is greater than three and no more than six times greater than the frequency of the voltage at the input.

4. A voltage regulator circuit as set forth in claim 3 wherein the set of primary windings comprises three Y-connected windings, wherein the first set of secondary windings comprises three Y-connected windings and wherein the second set of secondary windings comprises three delta-connected windings.

5. A voltage regulator circuit as set forth in claim 3 wherein the controllable switching means comprises a thyristor bridge having a-c input terminals connected to the capacitors and having d-c output terminals connected to the second inductance means.

6. A voltage regulator circuit as set forth in claim 1 wherein the set of primary windings comprises three Y-connected windings, wherein the first set of secondary windings comprises three Y-connected windings and wherein the second set of secondary windings comprises three delta-connected windings.

7. A voltage regulator circuit as set forth in claim 1 wherein said controllable switching means is connected between the capacitors and the second inductance means so as to establish a unidirectional current flow through the second inductance means.

8. A voltage regulator circuit comprising, in combination, a three phase a-c input for connection to a three-phase source of voltage, an output for connection to a load, line inductance means for supporting a voltage dependent upon the difference between the three-phase voltage at the a-c input and the voltage at the output, said line inductance means including at least three windings, a transformer having a set of three primary windings, a first set of three secondary windings and a second set of three secondary windings, means for connecting respective windings of the line inductance means between respective phases of the a-c input and the primary windings, means for connecting the first set of three secondary windings to the output, at least three capacitors connected in a closed circuit path, the sum of the capacitor voltages around said closed circuit path being equal to zero, means for connecting the second set of three secondary windings to the capacitors, discharge inductance means for conducting the flow of a resonant discharge current pulse through each capacitor, the resonant discharge frequency of the current pulses being determined by the discharge inductance means and the capacitors and being no less than three and no more than ten times greater than the frequency of any phase of the voltage at the a-c input, controllable switching means for sequentially initiating and terminating the flow of a resonant discharge current pulse through each capacitor and thereby redistributing charge among the then remaining capacitors, control means for generating firing signals for the controllable switching means, the control means serving to vary the phase position of the firing signals in relation to the phase position of the voltages at the a-c input so as to maintain a substantially constant voltage at the output.

9. A voltage regulator circuit as set forth in claim 8 wherein the line inductance means includes a magnetic core upon which are disposed three windings having substantially the same number of turns.

10. A voltage regulator circuit as set forth in claim 8 including rectifying means for establishing a d-c voltage at the output, said d-c voltage having a magnitude which varies in accordance with the peak voltage across the first set of secondary windings.

11. A voltage regulator circuit as set forth in claim 8 wherein said resonant discharge frequency is greater than three and less than six times the frequency of any phase of the voltage at the a-c input.

12. A voltage regulator circuit as set forth in claim 11 wherein the three primary windings are connected to one another in a Y-configuration, wherein the first set of three secondary windings are connected to one another in a Y-configuration and wherein the second set of three secondary windings are connected to one another in a delta-configuration.

13. A voltage regulator circuit as set forth in claim 8 wherein the controllable switching means comprises a thyristor bridge having a-c input terminals connected to the capacitors and having d-c output terminals connected to the discharge inductance means.

14. A voltage regulator circuit as set forth in claim 8 wherein at least six firing pulses are applied to the controllable switching means during each full cycle of the voltages at the a-c input.

15. A voltage regulator circuit comprising, in combination, a circuit input for connection to a polyphase a-c source, a circuit output for connection to a load, polyphase line inductance means for supporting a voltage dependent upon the difference in voltages between the a-c voltages at the circuit input and the voltage at the circuit output, a transformer having a set of polyphase primary windings, having a first set of polyphase secondary windings and having a second set of polyphase secondary windings, means for connecting the line inductance means between the circuit input and the primary windings, means for connecting the first set of secondary windings to the circuit output, at least three capacitors connected in a closed circuit path such that each capacitor can exchange charge with each adjacent capacitor, the capacitors serving as means for drawing a leading component of current from the circuit input through the line inductance means and the transformer, means for connecting the capacitors to the second set of secondary windings, controllable switching means for sequentially conducting a resonant discharge current pulse through each capacitor to reverse the polarity of the charge across that capacitor and redistribute charge among the then remaining capacitors, each resonant discharge current pulse having a resonant discharge frequency of from three to ten times the frequency of the voltage at the circuit input, and control means for changing the phase relationship between said resonant discharge current pulses and the voltages at the circuit input, in accordance with the voltage at the circuit output, to maintain the voltage at the circuit output at a substantially constant value.

16. A voltage regulator circuit as set forth in claim 15 wherein the primary windings comprise three Y-connected windings, wherein the first set of secondary windings comprise three Y-connected windings, wherein the second set of secondary windings comprise three delta-connected windings and wherein the plurality of capacitors comprise three delta-connected capacitors.

17. A voltage regulator circuit as set forth in claim 16 wherein each resonant discharge current pulse has a resonant discharge frequency of from three to six times the frequency of the voltage at the circuit input.

18. A voltage regulator circuit as set forth in claim 17 including rectifying means for establishing at the circuit output a d-c voltage having a magnitude approximately equal to the peak value of the voltage across the first set of secondary windings.

* * * * *